UNITED STATES PATENT OFFICE.

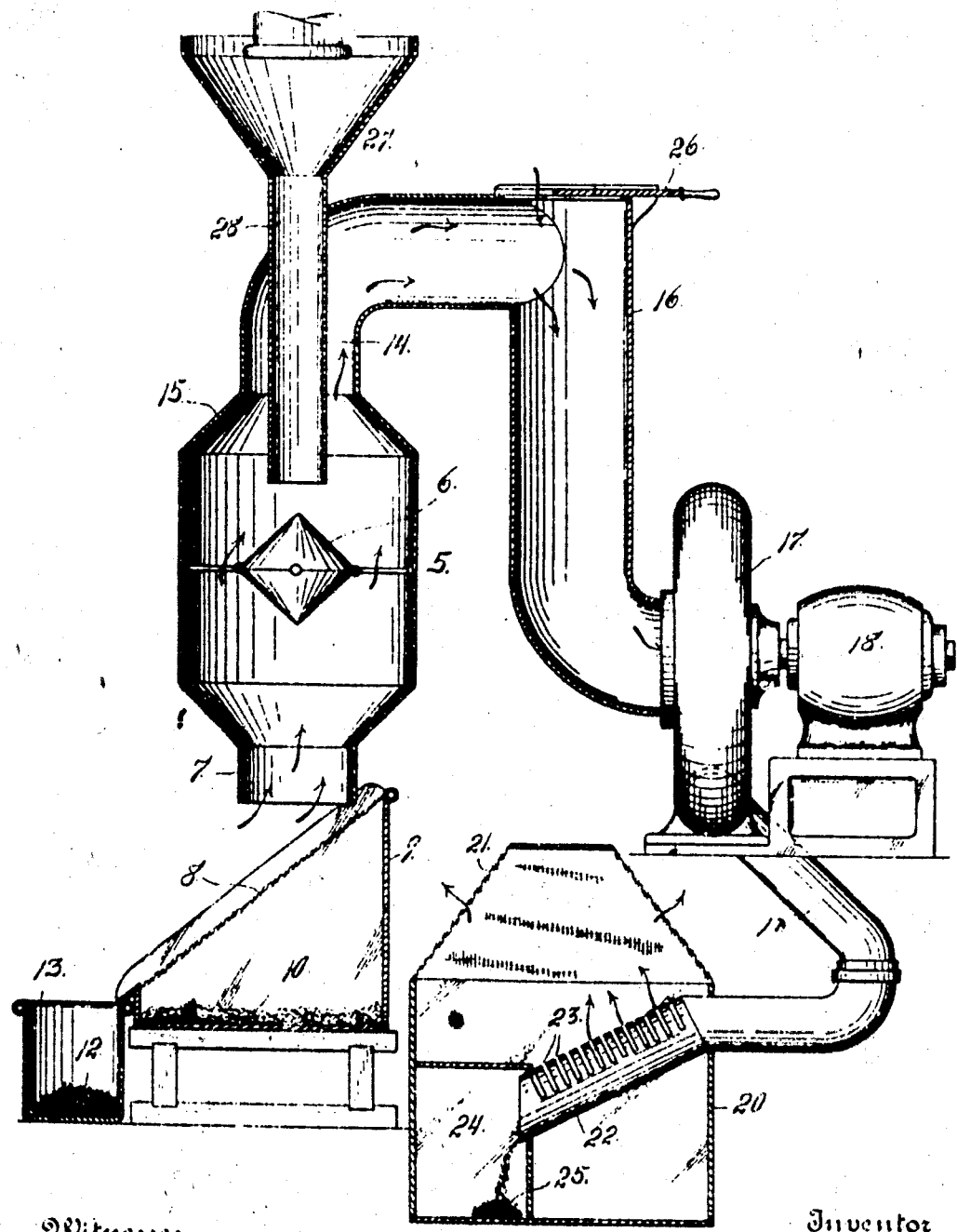

WILLIAM D. BALCOM, OF GREELEY, COLORADO, ASSIGNOR OF ONE-HALF TO NELLA C. BALCOM, OF GREELEY, COLORADO, AND ONE-FOURTH TO JOHN W. MOREY AND ONE-FOURTH TO EDGAR E. SELLERS, OF DENVER, COLORADO.

COFFEE-CLEANING APPARATUS.

977,697.  Specification of Letters Patent.  Patented Dec. 6, 1910.

Application filed December 5, 1908. Serial No. 446,176.

*To all whom it may concern:*

Be it known that I, WILLIAM D. BALCOM, a citizen of the United States, residing at Greeley, county of Weld, and State of Colorado, have invented certain new and useful Improvements in Coffee-Cleaning Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in apparatus for cleaning ground coffee, the object being to remove the chaff or light material which when left in the ground coffee, gives the drink made therefrom a bitter taste.

In my improved construction the coffee from the grinder is delivered to the cleaning apparatus in a downwardly directed stream, the cleaning device being provided with a spreader, which separates the ground coffee whereby it is more effectively acted upon by a current of air which is upwardly directed, moving in a direction opposite the coffee as it passes through the cleaner. The force or strength of this air current is so regulated that it will remove the waste material from the coffee and deliver it to a suitable receptacle while the valuable portion of the coffee is undisturbed by the said current and falls downwardly into a suitable receptacle. As shown in the drawing, a screen is arranged below the body of the cleaner upon which the ground coffee falls. The finer portion of the coffee passes through this screen into a receptacle below, while the coarser portion of the coffee, being rejected by the screen, passes into a separate receptacle. There is nothing particularly novel about this last named feature.

As shown in my improved construction, a suction fan is connected with a conduit, the latter being in communication with the body of the cleaner or that containing the spreading device. This fan or suction-inducing apparatus may be operated by an electric motor or any other suitable power. Provision is made for saving a relatively small portion of the coffee which is sufficiently light to be carried away with the air current. This falls into a receptacle located at the discharge extremity of the air conduit.

Having briefly outlined my improved construction, I will proceed to describe the same in detail, reference being made to the accompanying drawing in which is illustrated an embodiment thereof.

In this drawing, consisting of a single view, and in which the apparatus is shown chiefly in section, let the numeral 5 designate a vertically disposed open ended drum in which is suspended a centrally located spreader 6 which, as shown in the drawing, has the shape of two cones placed base to base, the apex of one cone extending upwardly, and that of the other downwardly. The lower extremity of this drum is provided with a reduced member 7 through which the coffee passes downwardly through an inclined screen 8 covering a receptacle 9 into which the finer portion 10 of the coffee passes. The coarser part 12, which is rejected by the screen, passes downwardly into a receptacle 13.

The upper extremity of the drum 5 merges into an elbow-shaped conduit 14, which is connected with the reduced upper part 15 of the drum. The extremity of the conduit 14 remote from the drum, communicates with a downwardly directed conduit member 16 leading to a fan 17 operated by a motor 18. A conduit member 19 leads from the fan and enters a housing 20 whose upper portion is covered with a screen 21 for the escape of the air. This housing is adapted to catch and retain the lighter portion or waste material which is removed from the ground coffee by the air current. Within the housing 20 is a conduit member 22 whose upper portion is slotted as shown at 23 for the escape of the waste material into the housing. This conduit member is downwardly inclined from the conduit 19, and its lower extremity opens into a compartment 24 into which the part 25 of the coffee which is removed by the air current is caught.

The upper extremity of the conduit member 16 is provided with a sliding gate or air check 26 whereby the draft or force of the air current may be regulated and controlled. It is evident that if this gate 26 be adjusted to form an opening at the top of the conduit member 16, the force of the air current will be reduced, while if the gate is kept closed, the said current will be increased in strength.

The coffee to be treated is delivered to the drum 5 through the agency of a funnel-shaped device 27 into which the ground coffee may be discharged from the grinder (not shown). The lower reduced part 28 of the funnel shaped device passes through an opening formed in the elbow 14 and extends downwardly into the drum 5 terminating a short distance above the upper apex of the spreader 6.

Assuming that the fan is in motion, an air current of any desired strength is caused to pass upwardly through the drum 5, thence through the elbow 14, downwardly through the conduit 16, through the fan, and thence through the conduit 19 into the housing 20. As the coffee is discharged upon the device 6 it is spread outwardly in all directions, forming a relatively thin sheet having the shape of a hollow cone through which the air current passes, the direction of the current being upwardly through the drum 5 and toward the apex of the hollow cone formed by the spreading of the coffee as it strikes the cone shaped spreader 6.

The action of the air current on the coffee results in removing the light worthless material, composed of the film of the coffee berry, therefrom, the said material being caused to travel with the air current, taking the path heretofore described, being finally delivered into the inclined conduit member 22 within the housing 20. The light worthless material passes outwardly through the slots 23 of the member 29 and is caught within the housing, the air being allowed to escape through the screen covering 21. Any coffee that may be carried with the air current passes downwardly through the inclined conduit member 22 and into the compartment 24 and is saved.

The coffee, after it has been subjected to the action of the upwardly traveling air current, whereby the waste material is removed therefrom, falls downwardly through the drum 5, finally coming in contact with the screen 8 through which the finer ground grade of coffee passes, falling into the receptacle 9, the coarser product passing downwardly over the screen 8 into the receptacle 12, as heretofore explained.

Having thus described my invention, what I claim is:

1. A coffee cleaner, comprising a vertically-disposed, open-ended drum suitably supported, a discharge pipe entering the drum from the top, a cone-shaped spreader located therein directly under the discharge pipe, a draft conduit communicating with the upper extremity of the drum, a screen-covered housing in which the opposite extremity of the conduit is located, a suction producing device located intermediate the conduit and a gate, located between the suction-producing device and the drum, as means of regulating the draft produced, substantially as described.

2. A coffee cleaner, comprising a vertically-disposed, open-ended pipe or drum, a cone-shaped spreader mounted thereon, means for discharging the coffee on the spreader from above, a draft conduit communicating with the upper extremity of the drum, a screen-covered housing in which the opposite extremity of the conduit enters, the extremity of the conduit within the housing having a plurality of slots for the escape of the waste material, and means for causing a draft therethrough, substantially as described.

3. A coffee cleaner, comprising an open-ended drum, means for causing the coffee to be treated to pass downwardly through the drum, means for producing an upward draft through the drum, a receptacle at the discharge extremity of the drum, and provided with an inclined screen cover upon which the clean coffee is discharged, a second receptacle adapted to receive the coarse grade of coffee from the inclined screen, while the fine grade passes through the screen into the first-named receptacle, and a screened housing communicating with the upper extremity of the drum into which the waste material is adapted to enter, under the action of the draft, substantially as described.

4. A coffee cleaner, comprising a vertically disposed drum, provided with reduced open ends, a cone-shaped spreader centrally suspended therein, a discharge pipe entering the drum from the top, and terminating above the apex of the spreader, whereby the coffee to be treated is discharged upon the latter, and caused to spread outwardly in all directions, a receiving receptacle provided with a screen cover, located under the lower extremity of the drum, a draft conduit communicating with the upper extremity of the drum, a screen covered housing in which the opposite extremity of the draft conduit is located, a suction producing device, located intermediate the said draft conduit, a gate, located intermediate the suction producing device and the drum, for regulating the draft therethrough, to cause the coarser grade of coffee to be discharged at the lower extremity of the drum on the inclined screen of the receiving receptacle, and the fine material to pass through the draft conduit and enter the screen covered housing under the influence of the suction producing means, substantially as described.

In testimony whereof I affix my signature in presence of two witnesses.

WILLIAM D. BALCOM.

Witnesses:
E. E. SELLERS,
A. EBERT O'BRIEN.